(12) United States Patent
Shen et al.

(10) Patent No.: US 10,346,996 B2
(45) Date of Patent: Jul. 9, 2019

(54) IMAGE DEPTH INFERENCE FROM SEMANTIC LABELS

(71) Applicant: Adobe Inc., San Jose, CA (US)

(72) Inventors: Xiaohui Shen, San Jose, CA (US); Zhe Lin, Fremont, CA (US); Scott D. Cohen, Sunnyvale, CA (US); Brian L. Price, San Jose, CA (US)

(73) Assignee: Adobe Inc., San Jose, CA (US)

( * ) Notice: Subject to any disclaimer, the term of this patent is extended or adjusted under 35 U.S.C. 154(b) by 630 days.

(21) Appl. No.: 14/832,328

(22) Filed: Aug. 21, 2015

(65) Prior Publication Data

US 2017/0053412 A1    Feb. 23, 2017

(51) Int. Cl.
*G06K 9/62* (2006.01)
*G06T 7/536* (2017.01)

(52) U.S. Cl.
CPC ............ *G06T 7/536* (2017.01); *G06K 9/6264* (2013.01)

(58) Field of Classification Search
CPC .. G06T 7/536; G06K 9/6264; G06K 9/00201; G06K 9/00664
See application file for complete search history.

(56) References Cited

U.S. PATENT DOCUMENTS

| | | | |
|---|---|---|---|
| 6,504,951 B1 | 1/2003 | Luo et al. | |
| 6,711,278 B1 | 3/2004 | Gu et al. | |
| 8,059,864 B2 | 11/2011 | Huang et al. | |
| 8,577,131 B1 | 11/2013 | Li et al. | |
| 9,811,756 B2 * | 11/2017 | Liu | G06K 9/4604 |
| 10,019,657 B2 | 7/2018 | Lin et al. | |
| 2004/0125124 A1 | 7/2004 | Kim et al. | |
| 2006/0159442 A1 | 7/2006 | Kim et al. | |
| 2006/0251337 A1 | 11/2006 | Redert et al. | |

(Continued)

FOREIGN PATENT DOCUMENTS

WO    WO-2014001062    1/2014

OTHER PUBLICATIONS

Liu, "Single Image Depth Estimation From Predicted Semantic Labels", Conference on Computer Vision and Pattern Recogntion (CVPR), 2014, 8 pages (referred to as Liu2 in the communication action).*

(Continued)

*Primary Examiner* — Chan S Park
*Assistant Examiner* — Elisa M Rice
(74) *Attorney, Agent, or Firm* — SBMC

(57) ABSTRACT

Image depth inference techniques and systems from semantic labels are described. In one or more implementations, a digital medium environment includes one or more computing devices to control a determination of depth within an image. Regions of the image are semantically labeled by the one or more computing devices. At least one of the semantically labeled regions is decomposed into a plurality of segments formed as planes generally perpendicular to a ground plane of the image. Depth of one or more of the plurality of segments is then inferred based on relationships of respective segments with respective locations of the ground plane of the image. A depth map is formed that describes depth for the at least one semantically labeled region based at least in part on the inferred depths for the one or more of the plurality of segments.

20 Claims, 8 Drawing Sheets

(56) References Cited

U.S. PATENT DOCUMENTS

| | | | |
|---|---|---|---|
| 2007/0121094 A1* | 5/2007 | Gallagher | G06K 9/00201 |
| | | | 356/4.03 |
| 2007/0156617 A1 | 7/2007 | Szummer et al. | |
| 2007/0177805 A1 | 8/2007 | Gallagher | |
| 2008/0150945 A1 | 6/2008 | Wang et al. | |
| 2008/0304743 A1* | 12/2008 | Tang | G06K 9/342 |
| | | | 382/173 |
| 2011/0274366 A1 | 11/2011 | Tardif | |
| 2013/0155061 A1* | 6/2013 | Jahanshahi | G06T 15/00 |
| | | | 345/419 |
| 2014/0240464 A1 | 8/2014 | Lee | |
| 2015/0142716 A1 | 5/2015 | Lucey et al. | |
| 2015/0371440 A1* | 12/2015 | Pirchheim | G06T 17/05 |
| | | | 345/419 |
| 2016/0350930 A1 | 12/2016 | Lin et al. | |

OTHER PUBLICATIONS

"Combined Search and Examination Report", GB Application No. 1605125.2, dated Sep. 21, 2016, 5 pages.
"Pre-Interview Communication", U.S. Appl. No. 14/724,660, dated Jun. 14, 2017, 6 pages.
Mousavian,"Joint Semantic Segmentation and Depth Estimation with DEEP Convolutional Networks", https://arxiv.org/abs/1604.07480, Apr. 25, 2016, 9 pages.
Wang,"Toward Unified Depth and Semantic Prediction from a Single Image", IEEE Conference on Computer Vision and Pattern Recognition (CVPR), Jun. 2015, 10 pages.
Arbelaez,"Contour Detection and Hierarchical Image Segmentation", Retrieved from <http://www.cs.berkeley.edu/~arbelaez/publications/amfm_pami2011.pdf> on Nov. 28, 2012, 2011, 20 pages.
Boix,"Harmony Potentials—Fusing Global and Local Scale for Semantic Image Segmentation", Int. Journal Computer Vision, 2012, 20 pages.
Carreira,"Semantic Segmentation with Second-Order Pooling", European Conference on Computer Vision 2012, 2012, 14 pages.
Eigen,"Depth Map Prediction from a Single Image using a Multi-Scale Deep Network", In NIPS, 2014., 2014, 9 pages.
Eigen,"Nonparametric Image Parsing using Adaptive Neighbor Sets", In CVPR, 2012, 8 pages.
Farabet,"Learning Hierarchical Features for Scene Labeling", In TPAMI, 2013, 15 pages.
Girschick,"Rich feature hierarchies for accurate object detection and semantic segmentation Tech report (v5)", Computer Vision and Pattern Recognition (cs.CV), Jun. 2014, 21 pages.
Gould,"Decomposing a Scene into Geometric and Semantically Consistent Regions", Computer Vision, 2009 IEEE 12, 2009, 9 pages.
Gupta,"Learning Rich Features from RGB-D Images for Object Detection and Segmentation", Computer Science > Computer Vision and Pattern Recognition, 2014, 16 pages.
Hane,"Joint 3D Scene Reconstruction and Class Segmentation", IEEE Conference on Computer Vision and Pattern Recognition (CVPR), 2013, 2013, 8 pages.
Hoiem,"Recovering Occlusion Boundaries from an Image", Int. J. Comput. Vision 91, 3 (Feb. 2011)., Feb. 2011, 8 pages.
Hoiem,"Recovering Surface Layout from an Image", International Journal of Computer Vision 75(1), Feb. 2007, 22 pages.
Karsch,"Depth Extraction from Video Using Non-parametric Sampling", Pattern Analysis and Machine Intelligence, IEEE Transactions on, 2014., 2014, 14 pages.
Krizhevsky,"ImageNet Classification with Deep Convolutional Neural Networks", In Advances in Neural Information Processing Systems 25, 2012, 9 pages.
Ladicky,"Pulling Things out of Perspective", Jun. 2014, 8 pages.
Leordeanu,"Efficient Closed-Form Solution to Generalized Boundary Detection", Computer Vision—ECCV 2012, Lecture Notes in Computer Science vol. 7575, 2012, 14 pages.
Liu,"Discrete-Continuous Depth Estimation from a Single Image", Conference on Computer Vision and Pattern Recognition (CVPR), 2014, 8 pages.
Liu,"Single Image Depth Estimation From Predicted Semantic Labels", Conference on Computer Vision and Pattern Recognition (CVPR), 2010, 8 pages.
Ren,"RGB-(D) Scene Labeling: Features and Algorithms", Conference on Computer Vision and Pattern Recognition (CVPR), 2012, 8 pages.
Russell,"LabelMe: a database and web-based tool for image annotation", IJCV 2007, May 2008, 33 pages.
Saxena,"Make3D: Learning 3D Scene Structure from a Single Still Image", Transactions on Pattern Analysis and Machine Intelligence, IEEE (vol. 31 , Issue: 5 ), May 30, 2008, 16 pages.
Silberman,"Indoor Segmentation and Support Inference from RGBD Images", ECCV 2012, 2012, 14 pages.
Singh,"Nonparametric scene parsing with adaptive feature relevance and semantic context", Conference on Computer Vision and Pattern Recognition (CVPR), 2013, 7 pages.
Tighe,"SuperParsing: Scalable Nonparametric Image Parsing with Superpixels", ECCV'10 Proceedings of the 11th European conference on Computer vision:, 2013, 14 pages.
Xiao,"SUN Database: Large-scale Scene Recognition from Abbey to Zoo", In CVPR, 2010, 2010, 8 pages.
Yang,"Context Driven Scene Parsing with Attention to Rare Classes", CVPR 2014, 2014, pp. 4321-4328.
Zheng,"Dense Semantic Image Segmentation with Objects and Attributes", In CVPR, Columbus, Ohio, United States, 2014., 2014, 2 pages.
Zhu,"Semi-Supervised Learning Using Gaussian Fields and Harmonic Functions", ICML 2003, 2003, 8 pages.
"Notice of Allowance", U.S. Appl. No. 14/724,660, dated Apr. 9, 2018, 14 pages.
"Supplemental Notice of Allowance", U.S. Appl. No. 14/724,660, dated Jun. 1, 2018, 3 pages.
"Supplemental Notice of Allowance", U.S. Appl. No. 14/724,660, dated Apr. 16, 2018, 7 pages.

* cited by examiner

IMAGE DEPTH INFERENCE FROM SEMANTIC LABELS

BACKGROUND

Depth estimation in images is typically utilized to estimate a distance between objects in an image scene and a camera used to capture the images. This is conventionally performed using stereoscopic images or dedicated depth sensors (e.g., time-of-flight or structured-light cameras) to identify objects, support gestures, and so on. Accordingly, this reliance on dedicated hardware such as stereoscopic cameras or dedicated depth sensors limits availability of these conventional techniques.

Although other conventional techniques have been developed to perform depth estimation without use of this dedicated hardware, these techniques rely on use of training data. Accordingly, these conventional techniques still rely on information obtained "outside" of an image to perform depth estimation of objects within the image. As such, this also limits availability of these techniques as well as associated techniques that rely on depth estimation, such as to perform hole filling in an image or other image processing.

SUMMARY

Image depth inference techniques and systems from semantic labels are described. In one or more implementations, a digital medium environment includes one or more computing devices to control a determination of depth within an image. Regions of the image are semantically labeled by the one or more computing devices. At least one of the semantically labeled regions is decomposed by the one or more computing devices into a plurality of segments formed as planes generally perpendicular to a ground plane of the image. Depth of one or more of the plurality of segments is then inferred by the one or more computing devices based on relationships of respective segments with respective locations of the ground plane of the image. A depth map is formed by the one or more computing devices that describes depth for the at least one semantically labeled region based at least in part on the inferred depths for the one or more of the plurality of segments.

In one or more implementations, a digital medium environment includes one or more computing devices to control a determination of depth within an image. Regions of the image are semantically labeled by the one or more computing devices. Depth for a plurality of planes within a single one of the semantically labeled regions is jointly inferred by the one or more computing devices. A depth map is formed by the one or more computing devices that describes depth for the at least one semantically labeled region based at least in part on the inferred depths for the plurality of planes within the single one of the semantically labeled regions.

In one or more implementations, a digital medium environment having one or more computing devices is configured to control a determination of depth within an image. The environment includes a system including a semantic labeling module implemented at least partially in hardware of the one or more computing devices to semantically label regions of the image. The system also includes a depth inference module implemented at least partially in hardware of the one or more computing devices to decompose at least one of the semantically labeled regions into a plurality of segments formed as planes that are generally perpendicular to a ground plane of the image. The system further includes a depth map generation module implemented at least partially in hardware of the one or more computing devices to form a depth map that describes depth for the at least one semantically labeled region based at least in part on the inferred depths for the one or more of the plurality of segments.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Figure 1:
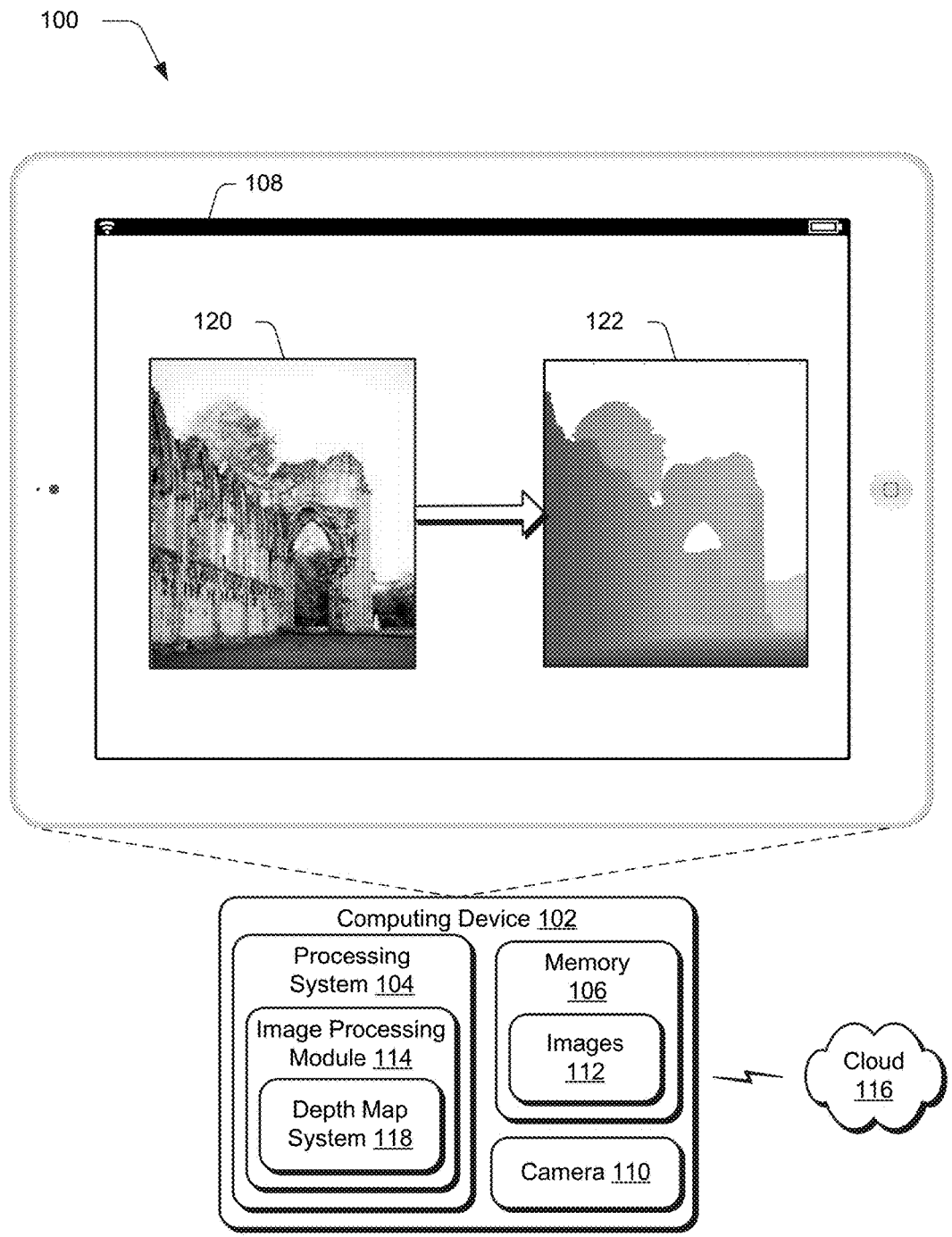
FIG. 1 is an illustration of an environment in an example implementation that is operable to employ image depth inference techniques described herein.

Depth of objects within an image is conventionally performed using dedicated hardware such as depth sensors and stereoscopic cameras. However, these devices are typically not readily available and are limited by an environment in which the devices are used, e.g., limitation of depth range, lighting, materials of the objects, and so forth. Other convention depth determination techniques infer depth from multiple images with different focal lengths, from multiple view or videos, and accordingly are also limited by the devices used to capture these multiple images and thus are not suitable for use with single images.

Additionally, some conventional techniques infer depth using training images and thus are limited based on similarity of an image being processed to images in the training set. Further, these conventional techniques may exhibit difficulty in obtaining ground-truth depth maps for images with various scene layouts, especially for those outdoor images with very long depth ranges. Accordingly, the efficacy of these learning-based techniques is limited by the possibilities of differences in the ground-truth training data.

A digital environment is described herein in which depth is inferred from a single image without use of dedicated hardware or training data and thus does not suffer from the requirements of additional devices or "outside" training data to generate a depth map describing distances of objects in an image from a device capturing the image. These depth maps may then be used to support a variety of functionality, such as image processing (e.g., hole filling, object removal, de-blurring, denoising), as part of gesture recognition through determination of depth of objects in a "z" space, and so forth.

In order to infer the depth, semantic labels are obtained for regions within the image, such as to label the regions according to categories as such sky, ground, building, plant, object, and so forth. This may be performed automatically and without user intervention by a computing device or based on manual annotations of a user. Assumptions of a generally ideal camera position are employed (e.g., the ground plane follows a generally horizontal plane in the image), which is then employed to assign depths to the ground and sky within the image.

Depth of remaining areas within the image are then inferred using a segment-based Gaussian Random Field technique in which relationships of a plurality of segments within a semantically labeled region to a ground plane (e.g., the semantically labeled ground and corresponding depths) are leveraged. For example, a coordinate of a pixel within a segment contacting a location of the ground plane may leverage a depth assigned to that location of the ground plane in the calculation of depth for that pixels and other pixels within the segment.

Further, calculation of the depths of the segments within the semantically labeled region may be performed jointly, such that calculation of a depth of one segment may be leveraged in the calculation of depth of another segment, e.g., based on similarity in appearance and arrangement, one to another. In this way, depths of a plurality of planes within semantically labeled regions may be inferred, which has increased accuracy over conventional techniques that assumed a single plane within each semantically labeled region. Additional examples are also contemplated, such as recognition of occlusion to calculate depth for regions that do not contact the ground plane, further discussion of which is included in the following sections and shown in corresponding figures.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

FIG. 1 is an illustration of an environment 100 in an example implementation that is operable to employ techniques usable to perform depth inference of a single image described herein. The illustrated environment 100 includes a computing device 102, which may be configured in a variety of ways.

The computing device 102, for instance, may be configured as a desktop computer, a laptop computer, a mobile device (e.g., assuming a handheld configuration such as a tablet or mobile phone as illustrated), and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices, such as multiple servers utilized by a business to perform operations "over the cloud" as further described in relation to FIG. 8.

The computing device 102 is illustrated as including a variety of hardware components, examples of which include a processing system 104, an example of a computer-readable storage medium illustrated as memory 106, a display device 108, a camera 110 usable to capture images 112, and so on. The processing system 104 is representative of functionality to perform operations through execution of instructions stored in the memory 106. Although illustrated separately, functionality of these components may be further divided, combined (e.g., on an application specific integrated circuit), and so forth.

The computing device 102 is further illustrated as including an image processing module 114. The image processing module 114 is representative of functionality to process and transform images 112, such as to perform object removal, lens blur, automatic object segmentation, content aware fill, as so forth. In some instances, these techniques rely on or may be improved by a depth map that describes depths of objects within the images 112. For content aware fill (e.g., hole filling), for instance, weight may be given to patches taken from a similar depth of the image as a target region to increase accuracy in filling the target region in the image. Although the image processing module 114 is illustrated as included locally at the computing device 102, this functionality may be divided between and/or implemented solely "over the cloud" as further described in relation to FIG. 8.

The image processing system 114 is also illustrated as including a depth map system 118. The depth map system 118 is representative of functionality to process a single image 120 without training data, use of dedicated hardware, or another other "outside" information to generate a depth map 122 that describes depths of regions, including individual pixels, of objects within the image 120. An example of generation of the depth map 122 from the image 120 is described in the following and shown in a corresponding figure.

Figure 2:
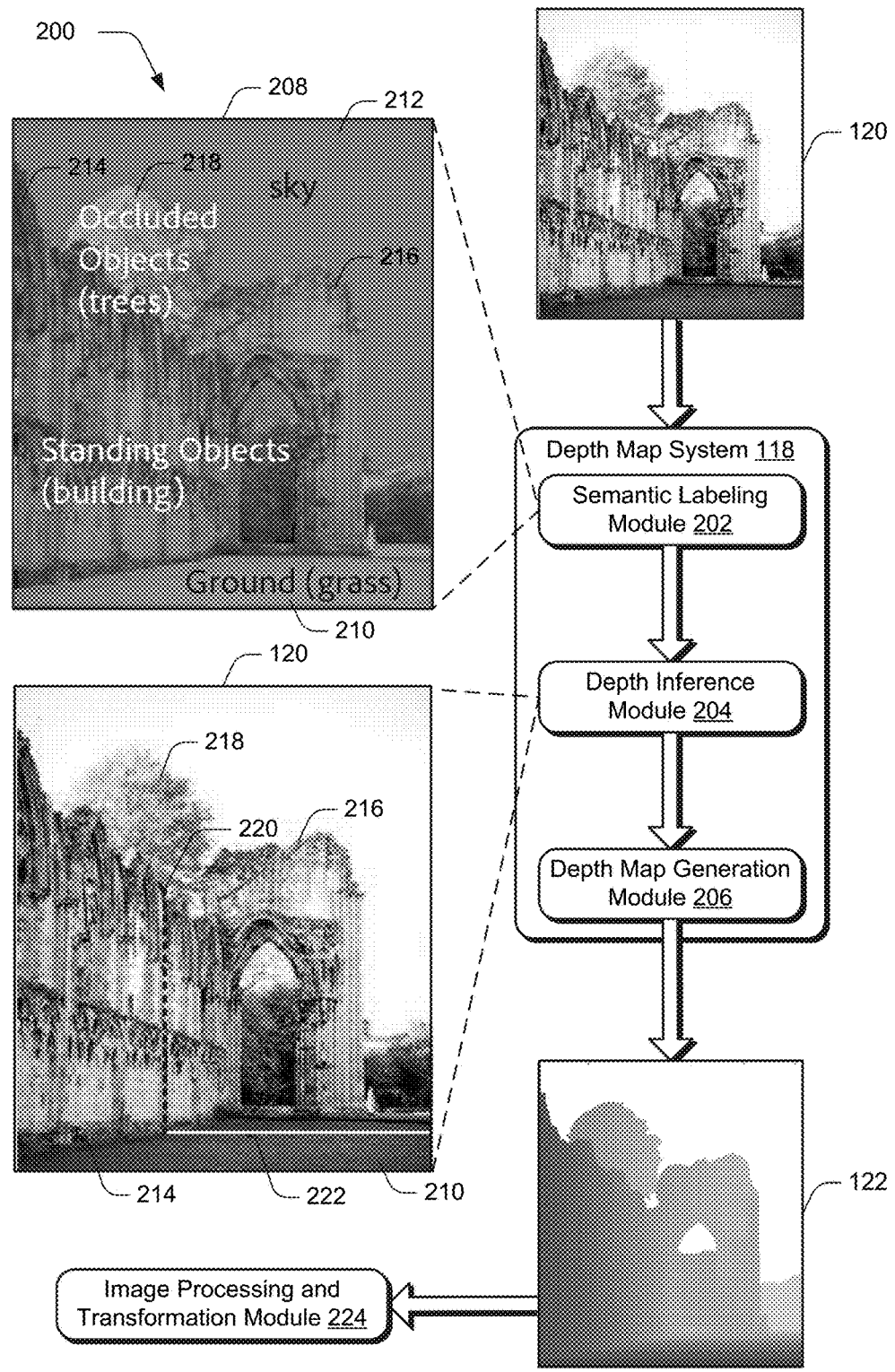
FIG. 2 depicts a system in an example implementation showing a depth map system of FIG. 1 in greater detail as generating a depth map from a single image without use of training data or dedicated hardware.

FIG. 2 depicts a system 200 in an example implementation showing the depth map system 118 of FIG. 1 in greater detail as generating a depth map 122 from a single image 120 without use of training data or dedicated hardware. The depth map system 118 is illustrated as including a semantic labeling module 202, depth inference module 204, and depth map generation module 206. The semantic labeling module 202 is representative of functionality to segment the image 120 into regions and obtain semantic meaning of the regions to assign semantic labels to those regions. As illustrated, a semantically labeled image 208 is shown that includes regions including ground 210, sky 212, standing objects 214, 126, and occluded object 218. Semantic segmentation is performable in a variety of ways, such as manually by a user or automatically and without user intervention, such as through use of automatic tools such as LableMe: a database and web-based tool for image annotation as described by Russel et al, IJCV 2007.

This is used to hallucinate a relative depth map 122 from a single RGB image 120 without any depth training data by the depth inference module 204. To do so, an ideal camera model may be assumed in which a horizontal axis of the camera is parallel to the ground, and thus a ground plane of the image 120 is defined as a horizontal plane. The depth of the ground 210 at different locations may then be inferred accordingly by the depth inference module 204, e.g., as a gradient based on distance from a bottom of the image such that greater depths are assigned to location of the ground 210 that are "higher up" in the image 120.

Following the ideal camera model, objects in the image 120 have a vertical component that is used to assign depth based on contact points with locations of the ground 210. In the illustrated image 120, for instance, a vertical plane taken of the wall 220 touches a horizontal location 222 on the ground 210. Accordingly, a contact point of the vertical plane of the wall 220 may leverage a depth assigned to the horizontal location 222 to compute a depth for that pixel as well as other pixels of the vertical plane. This process may continue for a plurality of vertical planes taken from the wall 220 as well as wall 216 and thus may define a plurality of planes for this single semantic region, which is not possible in conventional techniques that are limited to a single plane and therefore would define both walls as included as a single plane.

The depth inference module 204 may also employ a variety of other techniques for inferring depth. An example of which is used to address occluded objects, such as the trees 218 that do not contact the ground plane as further described below. Inferences from the depth inference module 204 are then used by the depth map generation module 206 to compute the depth map 122. In the illustrated example, relative depth values are indicated using shading such that darker pixels correspond to closer distances and lighter pixels are inferred to be further away from a device that captures the image 122. The depth may 122 is usable to support a variety of different functionality, such as to recognize gestures or as part of image processing, functionality of which is illustrated by an image processing and transformation module 224 to perform image editing such as lens blur, hole filling, and so on as previously described. Having generally described function of the depth map system 118, the following includes a detailed implementation example of processing performed by the depth map system 118 to generate the depth map 122 from the single image 120 without training data or other outside data such as data obtained from dedicated hardware devices.

Beginning again with the semantic labeling module 202, when estimating the depth, the geometric properties of semantic regions are used rather than specific meanings of the regions. For example, the ground 210 can be a grassland, street, or lake, and the depth maps generated for these regions would be similar regardless of their semantic meanings. Similarly, it is not necessary to know the type of a standing object on the ground 210 (e.g., a person, a car or something else) to infer its depth. Therefore, semantic labels for the semantic regions may be reduced to a set of categories, which thereby improves processing efficiency of the computing device 102.

For example, semantic labels may be assigned based a predefined set of categories, such as Sky, Ground, Building, Plant, and Object. Sky, for instance, may include types such as sky and clouds. For the ground, semantics types of ground such as a floor, road, grass, water, path, ground, beach, sea, street, lake, field, or river may be included. Buildings may include semantic types such as brick walls, concrete buildings, wall, a house, castle, church, hut, tower. Plants may include types such as trees, shrubs, plants, bushes, or foliage. The category of objects may be used to define all other types of object-level labels that may be identified by the semantic labeling module 202. Other examples are also contemplated.

According to the semantic labels of the semantically labeled regions, the images can be divided to two categories: with ground and without ground. When there exists a ground plane in the image 120, an ideal camera model is assumed in which the ground plane hence is a generally horizontal plane in the image 120. The depth can be assigned accordingly, with the depth values of the pixels larger than the ones below the pixels vertically in the image, i.e., the depth increases as pixels are arranged upward in the ground in the image. The semantically labeled regions to the category "sky" can be assigned with infinite depth or a maximum value after normalization.

However, the inference of depth of the remaining semantic labels is non-trivial. In conventional techniques, an entire semantically labeled region (e.g., building, or tree) is modeled as a single planar surface having values for depth that are estimated by fitting a robust line over the pixels along its boundary with the ground plane. This conventional planar assumption is not valid in many cases. For example in the first row of images in FIG. 3, images 302, resulting semantic segmentation 304, interred depth 306, and laser depth detection 308 is shown. For plants 310, a semantically labeled region 312 is formed that includes a tree in the foreground as well as plants in the background. Thus, it is apparent that the trunk in the foreground and the trees in the background should have different depth values with clear depth discontinuities along the trunk. Accordingly, conventional modeling of this entire region as a single plane would introduce error into a result bit map. A similar scenario may be seen in FIG. 2 in that different walls 214, 216 of a semantically labeled region of "building" in real life are disposed on different planes.

To address this issue, the depth map system 118 employs techniques and systems that are capable of handling depth estimation of the building and plant regions such that a plurality of planes are definable for a single semantically labeled region. Given a semantically labeled region, the depth inference module 204 first decomposes the region into a plurality of segments, e.g., super-pixels, in which each of the plurality of segments defines a vertical plane. Therefore, the depth of the pixels in segment can be approximated by:

$$d(x,y)=ax+b$$

where (x, y) is the coordinate of the pixel and x is the coordinate along the horizontal direction, a is a depth gradient, and b is an depth offset. Such approximation may not be mathematically correct in assigning the absolute depth values. However given that the camera parameters are not available, and the size of the segments is small, such an approximation provides sufficient accuracy to generate visually plausible depth maps with reduced consumption of processing resources and without use of outside data from dedicated devices or training images. Furthermore, the depth orientations of different segments can be different, and such decomposition is able to model more complex depth for the entire semantically labeled region.

The values a and b for each segment are unknown and therefore are solved in the following. For those segments in contact with the ground plane (e.g., segment 220 in contact with horizontal plane 222), a value of the depth of the pixels contacting the ground is obtained from depth values of the ground at that location by least square fitting. The depth from those pixels is then populated to calculate depth for other segments of the region.

To this end, this problem may be formulated as a semi-supervised classification problem in a Gaussian Random Field. Consider that there are segments whose depth are already inferred. Each segment is considered as a class with the inferred values a and b. The remaining u segments are classified with unknown depth to one of the l classes according to spatial locations and appearance similarities, one to another. To do this, an affinity matrix M is constructed, where M is a (l+u)×(l+u) symmetric matrix, and the entry $m_{ij}$ is the similarity between segment i and segment j. If the two segments are not adjacent, then $m_{ij}=0$, otherwise the following:

$$m_{ij}=S_{ij}^c+w_e S_{ij}^e$$

where $S_{ij}^c$ is the similarities according to average color $S_{ij}^c=\exp\{-\|\bar{c}_i-\bar{c}_j\|$, and $S_{ij}^e$ is similarities according to the edges. For instance, an edge map of the image 120 of obtained and if there is a strong edge between the two segments, $S_{ij}^e$ is low, otherwise $S_{ij}^e$ is high.

The matrix M can be rewritten as:

$$M = \begin{bmatrix} M_{ll} & M_{lu} \\ M_{ul} & M_{uu} \end{bmatrix}$$

Also let $$f = \begin{bmatrix} f_l \\ f_u \end{bmatrix},$$

which is the (l+u)×c label matrix, where c is the number of classes (in the present case c=l). Each row of $f_i$ indicates the label of the segment i. In $f_l$, only the values corresponding to the class labels are ones, and each of the other values are zeros. In the present case, $f_l$ is an identity matrix, as each class only has its own segment and $f_u$ is the label information that is inferred. An efficient closed-form solution for this problem may be defined as follows:

$$f_u=(D_{uu}-M_{uu})^{-1}M_{ul}f_l$$

where $D=\text{diag}(d_i)$ and $d_i=\Sigma_j m_{ij}$. In each row of fu, a class is chosen with the maximum value as the inferred class of the corresponding segment, and the depth values in this segment are assigned accordingly. Using this approach, the depth of regions with complex structures may be inferred to achieve visually more plausible results over conventional techniques as previously described.

In one or more implementations, the object category is approached two different ways by the depth inference module 204 according to the size of the object. If the object size is over a predefined threshold (i.e., large) and has a wide depth range according to its connection with the ground plane, the same approach introduced above is adopted to infer the depth inside the object. If the object is below the predefined threshold (i.e., small), the depth in the object is considered to be the same and an average depth is assigned according to the contact points to the ground plane as defined above, which may be used to conserve processing resources and increase a plausible result for the region.

For those semantically labeled regions without direct connections to the ground, an assumption is made that these regions are occluded by the object below. For example, for the trees 218 in the image 120 of FIG. 2, an assumption is made that at least a portion of the tree is occluded by the wall 214 below it. Although such an assumption may not be correct in each instance, it is the most common case in an outdoor image. Accordingly, depth of the bottom segments of these regions accordingly is assigned based on depth computed for the semantically labeled regions below it, and the same Gaussian Random Field techniques are used to propagate the depth to other segments in the semantically labeled region.

In one or more implementations, when the image does not contain ground, the depth map system 118 employs depth layer separation in which each semantically labeled region is a layer having the same depth. Semantically labeled regions at the bottom of the image are considered closest to the camera in an ideal camera model in and assigned with the smallest depth value accordingly. The depths of other regions are then assigned according to occlusion relations as described above.

Figure 3:
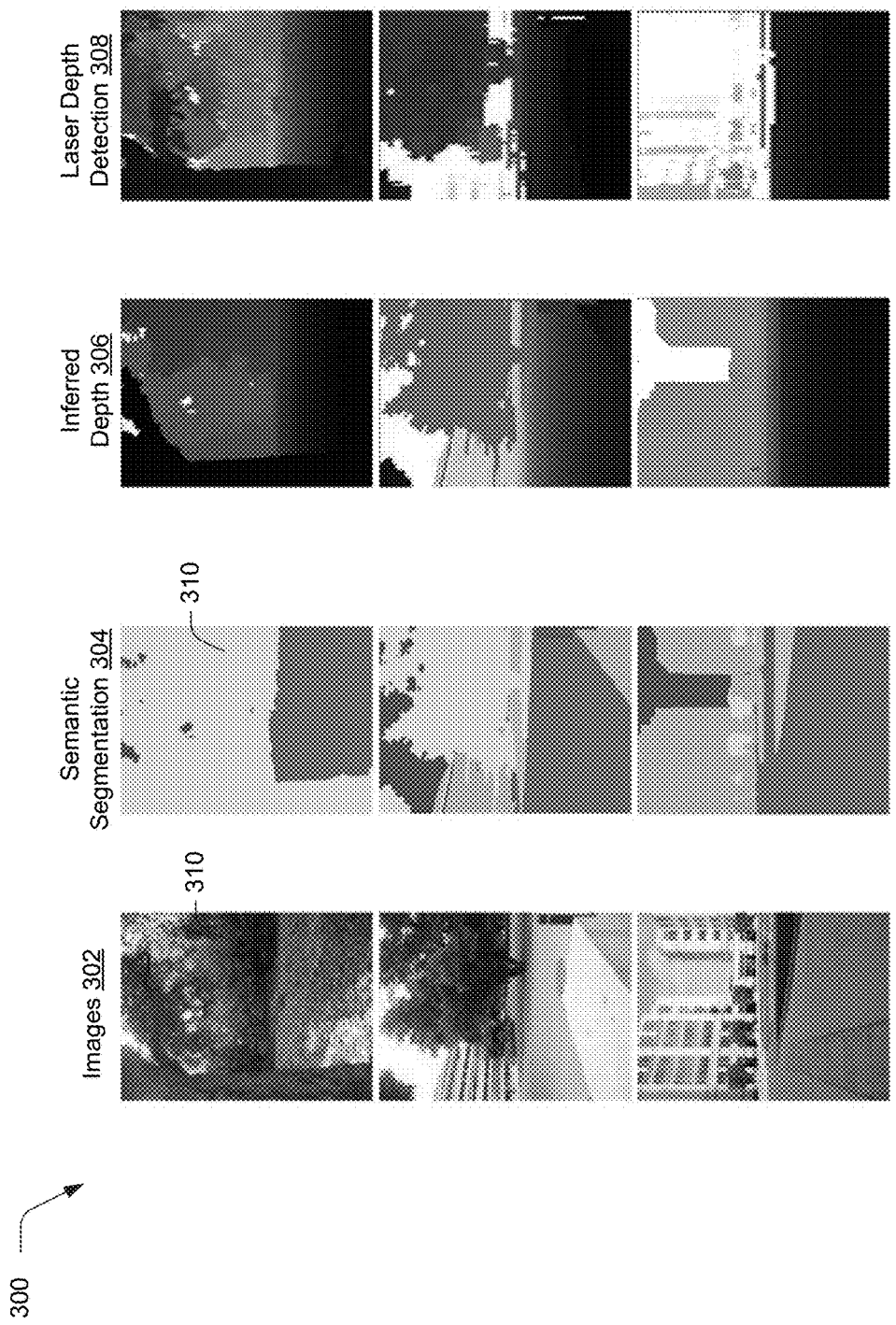
FIGS. 3, 4, and 5 depict example results of depth inference from a single image to generate a depth map without use of training data or dedicated hardware.

Since training data with ground-truth depth is not used, absolute depth values are not obtained but rather the techniques and systems hallucinate a relative depth map. Nonetheless, as shown in the example results 300, 400, 500 of FIGS. 3-5, visually plausible results are obtained. As shown in FIG. 3, images 302, semantic segments 304 of the images 304, inferred depth 306, and laser depth detection 308 are shown. A tree area 314 is differentiated from shrubs at greater depths with clear boundaries, which is not indicated in the semantic segmentation 304, through use of the Gaussian Fields based inference techniques and reflects results of laser depth detection 308.

Figure 4:
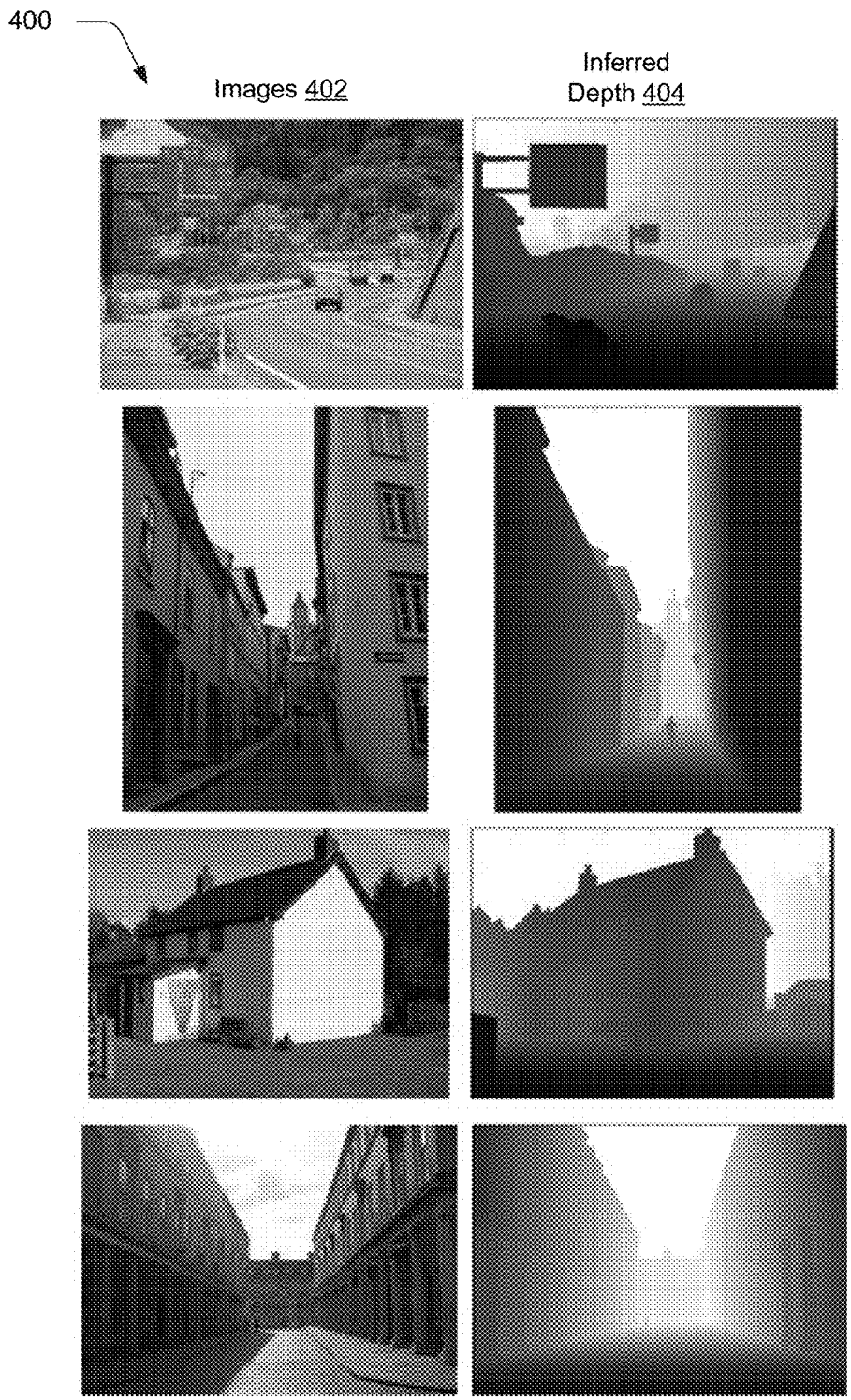
Figure 5:

In the examples 400, 500 of FIGS. 4 and 5, images 402, 502 and inferred depths 404, 504 formed as depth maps are shown. These examples illustrate advantages of dedicated hardware in that the dedicate hardware (e.g., a laser scanner) cannot capture depths of the buildings due to range, but the techniques described herein can. Further, as illustrated the depths of buildings are visually correct with multiple planar surfaces, which is not possible using convention single plane assumptions. As previously described, the depth maps may be used to support a variety of functionality, such as lens blur 506 as illustrated in FIG. 5.

Example Procedures

The following discussion describes techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-5.

Figure 6:
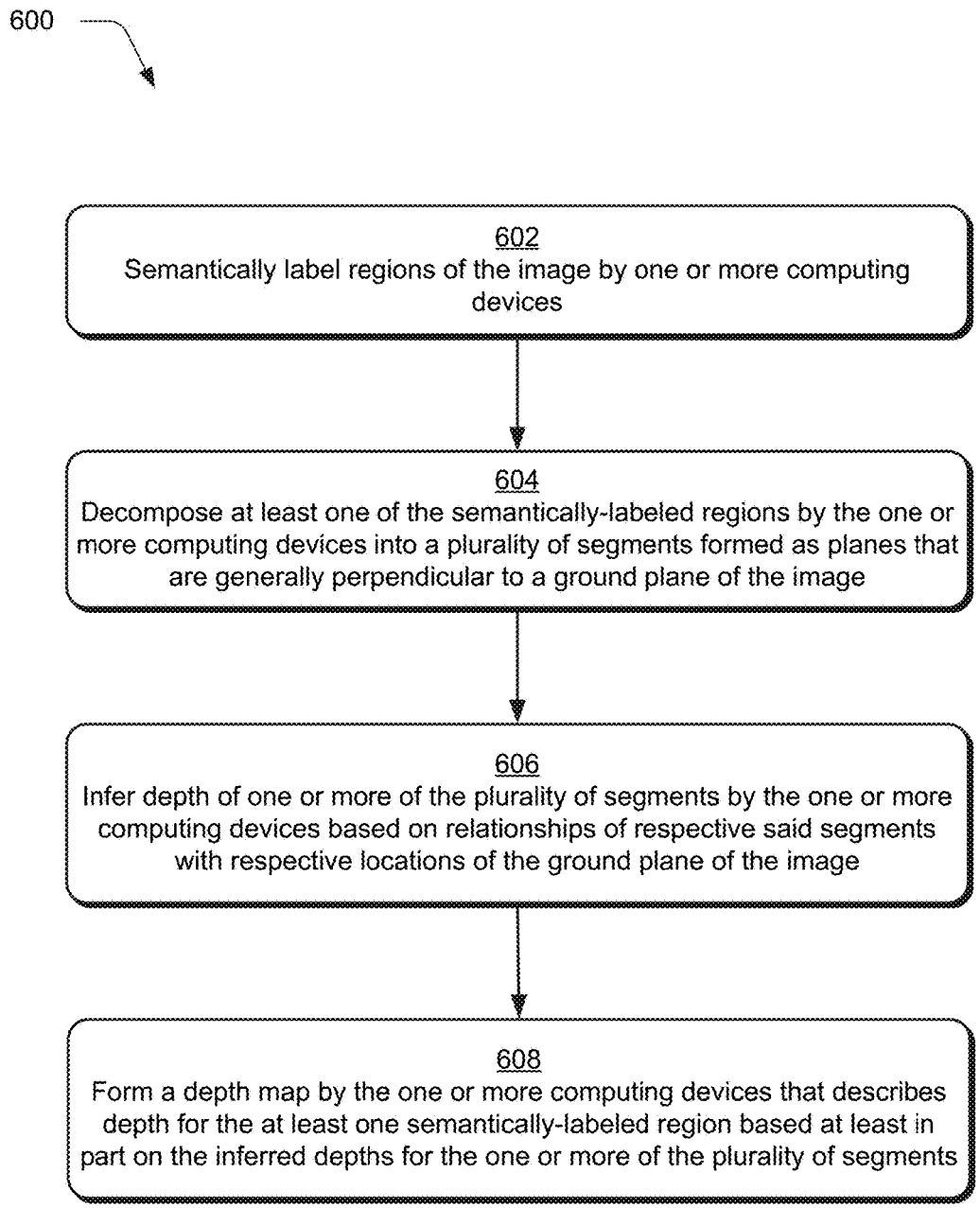
FIG. 6 is a flow diagram depicting a procedure in an example implementation in which a depth map is inferred from a single image without use of training data or dedicated hardware.

FIG. 6 depicts a procedure 600 in an example implementation in which a depth map is inferred from a single image without use of training data or dedicated hardware. As previously described, a digital medium environment includes one or more computing devices to control a determination of depth within an image. Regions of the image are semantically labeled by the one or more computing devices (block 602). Semantic labeling may be performed manually by a user through interaction with a user interface to specify the labels. Semantic labeling may also be performed automatically and without user intervention using one or more automated tools as previously described.

At least one of the semantically labeled regions is decomposed by the one or more computing devices into a plurality of segments formed as planes generally perpendicular to a ground plane of the image (block 604). An ideal camera position assumption, for instance, may be employed such that the ground is considered as following a horizontal plane in the image. Automated and manual techniques may also be performed to determine whether this is true and adjust accordingly, e.g., to correct for images in which the camera is held at a slight angle. Regardless of how determined, segments are formed as planes that are generally perpendicular to the ground plane in the image, an example of which is shown in FIG. 2.

Depth of one or more of the plurality of segments is then inferred by the one or more computing devices based on relationships of respective segments with respective locations of the ground plane of the image (block 606). For example, depth of the segment may be based on a depth of a location of the ground that is contacted by the segment.

A depth map is formed by the one or more computing devices that describes depth for the at least one semantically labeled region based at least in part on the inferred depths for the one or more of the plurality of segments (block 608). Continuing with the previous example, that depth may then be populated to determine the depth within the segment as well as to other segments within a semantically labeled region as part of a joint determination as further described below.

Figure 7:
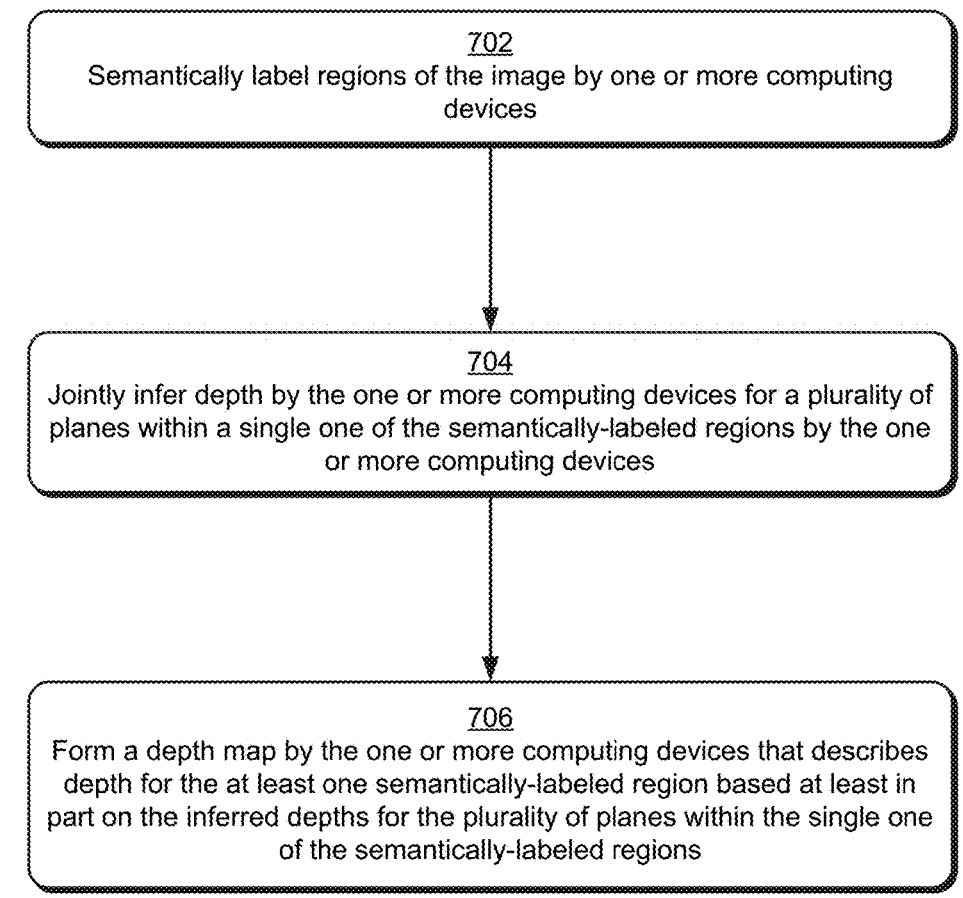
FIG. 7 is a flow diagram depicting another procedure in an example implementation in which in which a depth map is inferred from a single image without use of training data or dedicated hardware.

FIG. 7 depicts a procedure 700 in an example implementation in which a depth map is inferred from a single image without use of training data or dedicated hardware. As before, a digital medium environment includes one or more computing devices to control a determination of depth within an image. Regions of the image are semantically labeled by the one or more computing devices (block 702). As before, this may be performed manually by a user or automatically by the computing device 102.

Depth by the one or more computing devices for a plurality of planes within a single one of the semantically labeled regions is jointly inferred by the one or more computing devices (block 704). The depth map system 118, for instance, may employ the depth inference module 204 to jointly learn depths a plurality of segments within a region such that depths of one segment are usable to guide calculation of depths of other segments. This may take into account image similarity and respective positioning such that a plausible result is achieved as described above.

A depth map is formed by the one or more computing devices that describes depth for the at least one semantically labeled region based at least in part on the inferred depths for the plurality of planes within the single one of the semantically labeled regions (block 706). Thus, as previously described the semantically labeled region may also address a plurality of planes within a single region, which was not possible using conventional techniques and thus overcomes the errors of those techniques.

Example System and Device

Figure 8:
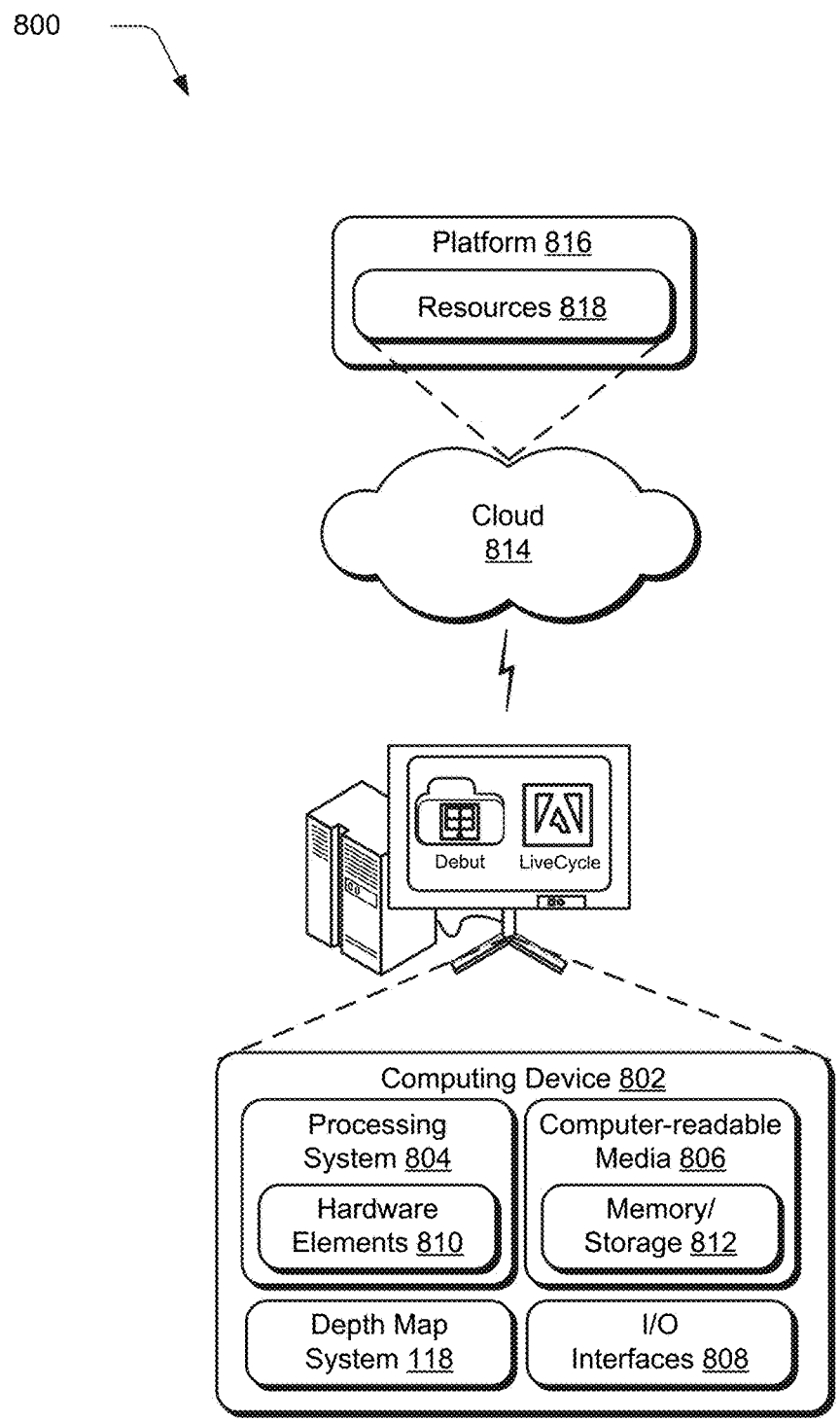
FIG. 8 illustrates an example system including various components of an example device that can be implemented as any type of computing device as described and/or utilize with reference to FIGS. 1-7 to implement embodiments of the techniques described herein.

FIG. 8 illustrates an example system generally at 800 that includes an example computing device 802 that is representative of one or more computing systems and/or devices that may implement the various techniques described herein. This is illustrated through inclusion of the depth map system 118. The computing device 802 may be, for example, a server of a service provider, a device associated with a client (e.g., a client device), an on-chip system, and/or any other suitable computing device or computing system.

The example computing device 802 as illustrated includes a processing system 804, one or more computer-readable media 806, and one or more I/O interface 808 that are communicatively coupled, one to another. Although not shown, the computing device 802 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware element 810 that may be configured as processors, functional blocks, and so forth. This may include implementation in hardware as an application specific integrated circuit or other logic device formed using one or more semiconductors. The hardware elements 810 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 806 is illustrated as including memory/storage 812. The memory/storage 812 represents memory/storage capacity associated with one or more computer-readable media. The memory/storage component 812 may include volatile media (such as random access memory (RAM)) and/or nonvolatile media (such as read only memory (ROM), Flash memory, optical disks, magnetic disks, and so forth). The memory/storage component 812 may include fixed media (e.g., RAM, ROM, a fixed hard drive, and so on) as well as removable media (e.g., Flash memory, a removable hard drive, an optical disc, and so forth). The computer-readable media 806 may be configured in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 802 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 802. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 802, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 810. The computing device 802 may be configured to implement particular instructions and/or functions corresponding to the software and/or hardware modules. Accordingly, implementation of a module that is executable by the computing device 802 as software may be achieved at least partially in hardware, e.g., through use of computer-readable storage media and/or hardware elements 810 of the processing system 804. The instructions and/or functions may be executable/operable by one or more articles of manufacture (for example, one or more computing devices 802 and/or processing systems 804) to implement techniques, modules, and examples described herein.

The techniques described herein may be supported by various configurations of the computing device 802 and are not limited to the specific examples of the techniques described herein. This functionality may also be implemented all or in part through use of a distributed system, such as over a "cloud" 814 via a platform 816 as described below.

The cloud 814 includes and/or is representative of a platform 816 for resources 818. The platform 816 abstracts underlying functionality of hardware (e.g., servers) and software resources of the cloud 814. The resources 818 may include applications and/or data that can be utilized while computer processing is executed on servers that are remote from the computing device 802. Resources 818 can also include services provided over the Internet and/or through a subscriber network, such as a cellular or Wi-Fi network.

The platform 816 may abstract resources and functions to connect the computing device 802 with other computing devices. The platform 816 may also serve to abstract scaling of resources to provide a corresponding level of scale to encountered demand for the resources 818 that are implemented via the platform 816. Accordingly, in an interconnected device embodiment, implementation of functionality described herein may be distributed throughout the system 800. For example, the functionality may be implemented in part on the computing device 802 as well as via the platform 816 that abstracts the functionality of the cloud 814.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment including one or more computing devices to control a determination of depth within an image, a method comprising:
   decomposing one of a plurality of semantically labeled regions of an image by the one or more computing devices into a plurality of segments formed as planes of the one semantically labeled region, the plurality of segments of the one semantically labeled region being generally perpendicular to a ground plane of the image;
   inferring depth of at least one of the plurality of segments by the one or more computing devices based on a depth of a location of the ground plane that is contacted by the at least one of the plurality of segments; and
   forming a depth map by the one or more computing devices that describes depth for the one semantically labeled region based at least in part on the inferred depths for the at least one of the plurality of segments.

2. The method as described in claim 1, wherein semantic labels used in the semantic labeling are selected from a plurality of categories.

3. The method as described in claim 2, wherein the plurality of categories include sky, ground, building, plant, or object.

4. The method as described in claim 1, wherein the depth map is generated without use of training data.

5. The method as described in claim 1, wherein the inferring of the depth includes:
- determining a coordinate of a pixel of the at least one of the plurality of segments that connects with a respective location of the ground plane by the one or more computing devices;
- using a horizontal direction of the coordinate along with a depth gradient and depth offset computed based on the respective location to the ground plane to infer the depth of the pixel; and
- propagating the depth of the pixel for determination of depth of other pixels in the respective said segments by the one or more computing devices.

6. The method as described in claim 5, wherein the propagating is performed using a Gaussian Random Field technique.

7. The method as described in claim 6, wherein the Gaussian Random Field technique is performed as a classification problem in which depths of one or more other segments of the one semantically labeled region are classified to a respective one of a plurality of the inferred depths of the respective said segments based on spatial locations and appearance similarities, one to another.

8. The method as described in claim 5, wherein the depth gradient and depth offset are calculated from the ground plane using least square fitting.

9. The method as described in claim 5, wherein the determining, the using, and the propagating are performed for semantically labeled regions that have a size that is determined by the one or more computing devices to be over a defined threshold.

10. The method as described in claim 9, wherein at least one of the semantically labeled regions is determined by the one or more computing devices to have a size below the threshold and the inferring of the depth for the one semantically labeled region is performed such that a single depth is inferred for an entirety of the one semantically labeled region.

11. The method as described in claim 1, further comprising inferring depth for another one of the semantically labeled regions that is not in contact with the ground plane based at least in part on an assumption that the other semantically labeled region is at least partially occluded by one or more other semantically labeled regions below the other semantically labeled region in the image and applying a random field technique to propagate within the semantically labeled region.

12. The method as described in claim 1, further comprising:
- segmenting the image into a plurality of regions; and
- forming a plurality of semantically labelled regions by assigning semantic labels to the plurality of regions based on a semantic meaning of respective said regions.

13. In a digital medium environment including one or more computing devices to control a determination of depth within an image, a method comprising:
- semantically labeling regions of the image by one or more computing devices;
- decomposing a single one of the semantically labeled regions by the one or more computing devices into a plurality of segments formed as vertical planes of the one semantically labeled region;
- jointly inferring depth by the one or more computing devices for the plurality of segments within the single one of the semantically labeled regions such that information is shared, one to another, for the plurality of segments as part of the inferring, the inferring based at least in part on a depth of a location of a ground plane that is contacted by a respective segment of the plurality of segments; and
- forming a depth map by the one or more computing devices that describes depth for the at least one semantically labeled region based at least in part on the inferred depths for the plurality of segments within the single one of the semantically labeled regions.

14. The method as described in claim 13, wherein the jointly inferring depth includes:
- using a horizontal direction of a coordinate of a pixel of the respective said segments that connect with the ground plane along with a depth gradient and depth offset computed based on the ground plane to infer the depth of the pixel by the one or more computing devices; and
- propagating the depth of the pixel for joint determination of depth of other pixels in the respective said segments by the one or more computing devices.

15. The method as described in claim 13, wherein the jointly inferring is performed without using training data.

16. In a digital medium environment having one or more computing devices to control a determination of depth within an image, a depth map system comprising:
- a semantic labeling module implemented at least partially in hardware of the one or more computing devices to semantically label regions of the image;
- a depth inference module implemented at least partially in hardware of the one or more computing devices to decompose at least one of the semantically labeled regions into a plurality of segments formed as planes that are generally perpendicular to a ground plane and infer depth of each of the plurality of segments based on relationship of respective said segments with respective locations of the ground plane of the image by:
  - determining a coordinate of a pixel of the respective said segments that connect with the respective location of the ground plane by the one or more computing devices;
  - using a horizontal direction of the coordinate along with a depth gradient and depth offset computed based on the respective location to the ground plane to infer the depth of the pixel; and
  - propagating the depth of the pixel for determination of depth of other pixels in the respective said segments by the one or more computing devices; and
- a depth map generation module implemented at least partially in hardware of the one or more computing devices to form a depth map that describes depth for the at least one semantically labeled region based at least in part on the inferred depths for the one or more of the plurality of segments.

17. The system as described in claim 16, wherein the propagating is performed using a Gaussian Random Field technique.

18. The system as described in claim 17, wherein the Gaussian Random Field technique is performed as a classification problem in which depths of one or more other segments of the at least one region are classified to a respective one of a plurality of the inferred depths of the respective said segments based on spatial locations and appearance similarities, one to another.

19. The system as described in claim 16, wherein the determining, the using, and the propagating are performed for semantically labeled regions that have a size that is determined by the depth inference module to be over a defined threshold.

20. The system as described in claim 19, wherein at least one of the semantically labelled regions is determined by the depth inference module to have a size below the threshold and the inferring of the depth for the at least one semantically labeled region is performed such that a single depth is inferred for an entirety of the at least one semantically labeled region.

* * * * *